United States Patent Office.

JOSIAH W. ELLS, OF PITTSBURG, PENNSYLVANIA.

Letters Patent No. 69,904, dated October 15, 1867.

---

IMPROVED MODE OF COATING WROUGHT IRON WITH CAST STEEL.

---

The Schedule referred to in these Letters Patent and making part of the same.

---

TO ALL WHOM IT MAY CONCERN:

Be it known that I, JOSIAH W. ELLS, of the city of Pittsburg, in the county of Allegheny, and State of Pennsylvania, have invented a new and useful article of manufacture, to wit, slabs, sheets, plates, bars, and rods of wrought iron, having a uniform coating, face, or surface of cast steel; and I hereby declare that the following is a full, clear, and exact description of the method or manner of making the same.

I take a "bloom" or short, thick bar of wrought iron, previously brought to a welding heat, and while in that condition place it in a properly-constructed flask or mould, sufficiently large to leave a small space between the two. Into this space I pour molten steel, which effects a perfect union with the hot iron. As soon as the steel is "set," or becomes sufficiently cool to bear removal from the mould, I fashion the compound ingot so made into slabs, sheets, plates, bars, and rods by the operation known as "rolling."

The operation or application of this principle, by changing the position of the "bloom" in the mould, enables me to place or put the cast-steel coating or surface on any one or more, or on all sides of the slabs, sheets, plates, bars, and rods of wrought iron as may be desired, and of any required degree of thickness, thus adapting the slabs, sheets, plates, bars, and rods so formed to any and all uses to which it may be desired to apply them.

By this means or process I am enabled to make slabs, sheets, plates, bars, and rods of iron and steel combined, having a very hard uniform wearing surface of steel united to a tough interior or back of wrought iron, and applicable to the manufacture of various things useful in the arts, and which may be cut into any shape, and hardened or tempered without danger of cracking or warping the steel surface.

Having thus briefly described my invention, I claim as a new and merchantable article of manufacture—

Slabs, sheets, plates, bars, and rods of wrought iron having a uniform coating, face, or surface of cast steel, applied, as hereinbefore set forth, on any one or more, or on all sides of the same, and of any required degree of thickness.

JOSIAH W. ELLS.

Witnesses:
    EB. WILLIAMS, Jr.,
    HENRY B. WILLIAMS.